(No Model.) 2 Sheets—Sheet 1.

T. TATNALL.
HAY OR STRAW CUTTER.

No. 331,343. Patented Dec. 1, 1885.

WITNESSES:
Norris A. Clark
Arthur S. Brown

INVENTOR.
Thomas Tatnall,
By
W. E. Witherbee,
Attorney.

(No Model.) 2 Sheets—Sheet 2.
T. TATNALL.
HAY OR STRAW CUTTER.
No. 331,343. Patented Dec. 1, 1885.
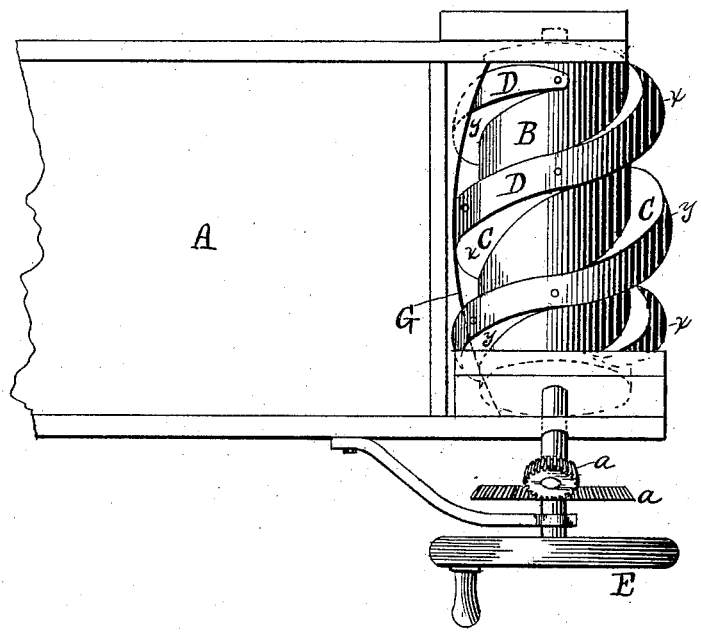
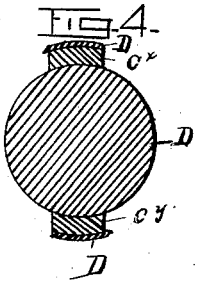
WITNESSES:
Norris A. Clark.
Arthur S. Brown.
INVENTOR:
Thomas Tatnall
by W. E. Witherbee
Atty

United States Patent Office.

THOMAS TATNALL, OF WILMINGTON, DELAWARE.

HAY OR STRAW CUTTER.

SPECIFICATION forming part of Letters Patent No. 331,343, dated December 1, 1885.

Application filed October 6, 1884. Serial No. 144,830. (No model.)

*To all whom it may concern:*

Be it known that I, THOMAS TATNALL, of Wilmington, in the county of Newcastle and State of Delaware, have invented a new and Improved Hay or Straw Cutter; and I do hereby declare that the following is a full and exact description thereof, reference being had to the accompanying drawings, making part of this specification.

This invention relates particularly to the cutting mechanism of a hay and straw cutter; and it consists in the construction of the cutting-knives of novel shape.

Figure 1:
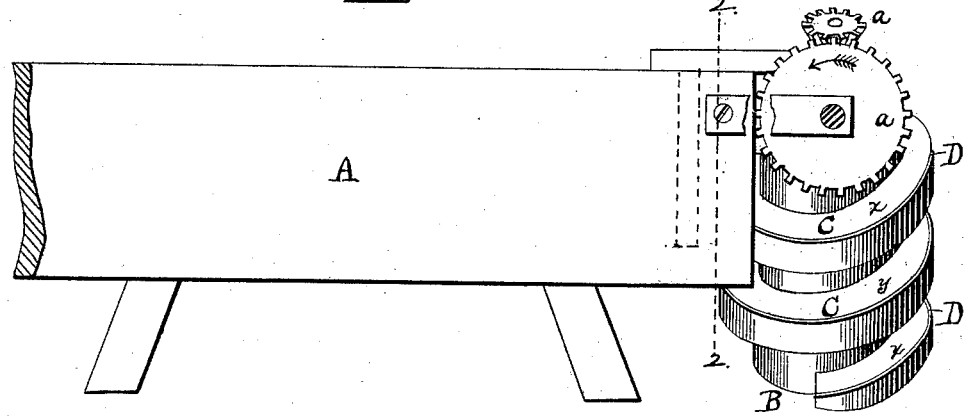
Figure 2:
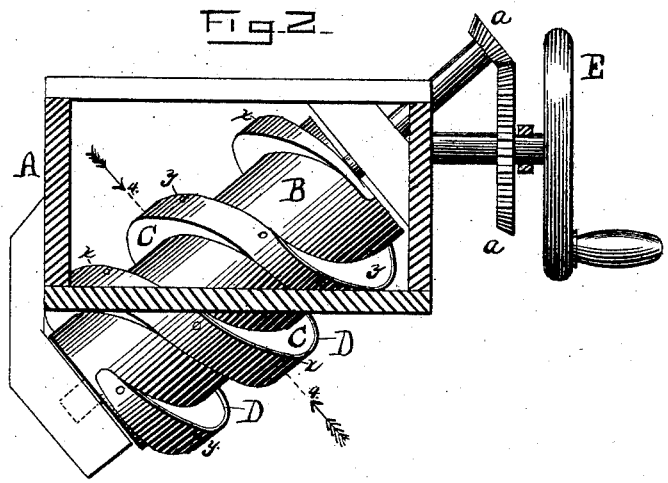

In the drawings, Figure 1 is a side view of a hay and straw cutter provided with my improved cutting knives. Fig. 2 is a vertical cross-section thereof in a plane indicated by the line 2 2, Fig. 1. Fig. 3 is a top view of the cutter, and Fig. 4 is a cross section of cutter-shaft in a plane perpendicular to the axis thereof, as indicated by the line 4 4 of Fig. 2.

Like letters designate corresponding parts in all of the figures.

A is the cutter-box, at one end of which is mounted my improved cutting mechanism. This mechanism consists of a cylindrical shaft, B, which is mounted diagonally across one end of the box. This shaft is formed or otherwise provided with a spiral rib or ribs, C, extending around the same. These ribs are preferably two in number, being distinguished in the drawings by the letters *x* and *y*, and they intercircle about the shaft in the same manner as the threads in the ordinary double-threaded screw. Secured to these ribs are suitable cutting-knives, D. These knives are preferably thin bands of steel, which can be easily removed for sharpening or resetting. The shaft B is rotated by any suitable means, such as a crank-wheel, E, to which it is connected by gear-wheels *a a*. The bottom of the box is provided with a cutting-edge, G, which is curved to conform with the curve of the knives D.

In using this cutting mechanism the shaft B is rotated in a direction from right to left, opposite to the motion of the hands of a watch, so that the cut of the knives is a downward cut. At the same time it is to be noticed that the cut of the knives along the edge G is a shear cut as well as a downward cut. By the use of the double spiral knives the cutting of the straw or hay is a continuous operation, the position of the two knives being so related that as one knife ceases to cut the other commences. The main advantages gained by this cutting mechanism are, first, that the cutting is a continuous operation, so that the power taken to work the mechanism is uniform and steady; second, that a shear cut is obtained which requires less power than any other; third, that by reason of the spiral shape of the knives the shear cut is always at the same angle, so that the power required is the same at all points; fourth, that the cut is a draw cut as well, and, fifth, that owing to the shear cut the knives will work much longer without resharpening.

I claim as my invention—

1. In a hay or straw cutter, a diagonal shaft mounted thereon and provided with a spiral knife encircling it, in combination with the cutting-box provided with a stationary knife co-operating with said spiral knife, substantially as set forth.

2. In a hay or straw cutter, a diagonal shaft mounted thereon, provided with a spiral rib encircling it, and a band-knife secured to said rib, in combination with the cutting-box provided with a stationary knife co-operating with said spiral knife, substantially as set forth.

3. In a hay or straw cutter, a diagonal shaft mounted thereon, provided with double spiral knives encircling it, in combination with the cutting-box provided with a stationary knife co-operating with said spiral knives, substantially as set forth.

In testimony whereof I have hereunto signed my name in presence of witnesses.

THOMAS TATNALL.

Witnesses:
HENRY C. CONRAD,
JOSEPH W. VANDEGRIFT.